(12) United States Patent
Mendez Hernandez et al.

(10) Patent No.: US 8,137,074 B2
(45) Date of Patent: Mar. 20, 2012

(54) WIND TURBINE LIGHTNING PROTECTION SYSTEM

(75) Inventors: Yaru Najem Mendez Hernandez, Munich (DE); Bastina Lewke, Garmisch-Partenkirchen (DE); Matthias Menzel, Munich (DE); Wilhelm Feichter, Munich (DE); Sebastian Gerhard Maxim Kraemer, Munich (DE)

(73) Assignee: General Electric Company, Niskayuna, NY (US)

( * ) Notice: Subject to any disclaimer, the term of this patent is extended or adjusted under 35 U.S.C. 154(b) by 808 days.

(21) Appl. No.: 12/229,334

(22) Filed: Aug. 21, 2008

(65) Prior Publication Data

US 2010/0047074 A1 Feb. 25, 2010

(51) Int. Cl.
*F01D 5/14* (2006.01)
(52) U.S. Cl. .................. 416/230; 416/224
(58) Field of Classification Search .......... 416/230, 416/241 R, 146 R, 224, 229 R, 247 R
See application file for complete search history.

(56) References Cited

U.S. PATENT DOCUMENTS

| | | | | |
|---|---|---|---|---|
| 6,457,943 B1 * | 10/2002 | Olsen et al. | ................. | 416/230 |
| 6,932,574 B2 | 8/2005 | Wobben | ................. | 416/146 |
| 2004/0130842 A1 | 7/2004 | Johansen et al. | ................. | 361/117 |
| 2004/0253114 A1 * | 12/2004 | Gunneskov et al. | ................. | 416/224 |
| 2005/0175457 A1 * | 8/2005 | Yoshida | ................. | 416/142 |
| 2006/0013695 A1 | 1/2006 | Pedersen | ................. | 416/248 |
| 2007/0258823 A1 * | 11/2007 | Haarh et al. | ................. | 416/223 R |
| 2008/0095624 A1 * | 4/2008 | Lewke | ................. | 416/146 R |
| 2008/0181775 A1 * | 7/2008 | Livingston et al. | ................. | 416/95 |
| 2009/0246025 A1 * | 10/2009 | Lewke et al. | ................. | 416/146 R |

FOREIGN PATENT DOCUMENTS

| | | |
|---|---|---|
| DE | 44 36 197 | 4/1996 |
| DE | 10228665 | 5/2003 |
| EP | 0707145 | 4/1996 |
| EP | 0718495 | 6/1996 |
| EP | 1 011 182 A1 | 6/2000 |
| EP | 1 036 937 A2 | 9/2000 |
| EP | 1 112 448 B1 | 7/2003 |
| EP | 1 375 913 A1 | 1/2004 |
| EP | 1 522 725 | 4/2005 |
| EP | 1 826 402 A1 | 8/2007 |

(Continued)

OTHER PUBLICATIONS

Kormos et al., The stability of SnO2:Sb (ATO) nanostructured protecting films on glass, 2006, Digest Journal of Nanomaterials and Biostructures, vol. 1, No. 3, pp. 107-114.*

Ginger Gardiner, "Lightning Strike Protection for Composite Structures", *High-Performance Composites*: vol. 14, Issue 4, pp. 44-50, Jul. 2006.

(Continued)

*Primary Examiner* — Thomas L Dickey
*Assistant Examiner* — Nikolay Yushin
(74) *Attorney, Agent, or Firm* — Ann M. Agosti

(57) ABSTRACT

A glass-reinforced fiber or carbon-reinforced wind turbine blade having a suction side and a pressure side includes a tip portion adapted with an electric field control region disposed solely on or within the tip portion. The electric field control region is in electrical communication with or galvanically connected to an electric discharge conduction mechanism, wherein the electric field control region and the electric discharge conduction mechanism together operate to protect a wind turbine and its associated blade(s) from damage due to a lightning strike at the tip of the wind turbine blade(s) by controlling an electric field at the tip portion(s) caused by the lightning strike.

22 Claims, 1 Drawing Sheet

FOREIGN PATENT DOCUMENTS

| | | |
|---|---|---|
| EP | 1 830 063 A1 | 9/2007 |
| JP | 2006/037938 | 2/2006 |
| WO | WO 9425752 | 11/1994 |
| WO | WO 00/14405 | 3/2000 |
| WO | WO 04/001224 A1 | 12/2003 |
| WO | WO 2004/044419 A1 | 5/2004 |
| WO | WO 2005/026538 A1 | 3/2005 |
| WO | WO 2005/050008 A1 | 6/2005 |
| WO | WO 2005/050808 A1 | 6/2005 |

OTHER PUBLICATIONS

Takehiro Naka et al., "Study on Lightning Protection Methods for Wind Turbine Blades", *IEEJ Transactions on Power and Energy*, vol. 125, No. 10, pp. 993-999, 2005.

* cited by examiner

WIND TURBINE LIGHTNING PROTECTION SYSTEM

BACKGROUND

The invention relates generally to wind turbines, and more specifically to a lightning protection system and method for wind turbines and their associated blades.

A wide variety of lightning protection systems for protection of wind turbines and their associated blades are known within the art. Wind turbines are usually erected in open spaces or in more recent years at sea where they form the highest point and often attract lightning. The tips of the wind turbine blades reach the highest position and are therefore the usual place of impact for lightning.

In the past, the fact that blades were often made of a non-conductive material such as glass fibre lead to the belief that lightning was not a problem. However, such blades are often covered by a thin layer of dust, salt or pollution and together with moisture, the risk of conducting a current is real and results in several unprotected blades being damaged or destroyed by lightning.

The issue of establishing lightning protection for wind turbine blades has generated several different solutions. One solution is intended to prevent the electrical current from a lightning striking the blades of the wind turbine from entering the generator and other electrical and electronic components situated in the top of the wind turbine. This is done by conducting the electrical current from the blades to the tower of the wind turbine and to the ground.

Based on their height and exposed positions, wind turbines offer preferred impact positions for lightning strikes. Wind turbine installations in regions with high ceraunic activities especially require sophisticated protection systems. Most endangered components are the electrical installations, the control electronics and the blades. Later ones are manufactured of glass-fiber reinforced plastics. Their damage or destruction due to lightning results in the longest down-time of the facility.

Modern wind turbines are equipped with blades of approximately 50 m length. Although being made of electrically insulating glass-fiber reinforced plastics, the blades form preferred impact spots for a lightning discharge. To avoid damage or destruction by lightning strikes, these blades are equipped with a lightning protection system (LPS). The most common LPS consists of several metallic discrete receptors that are implemented into the blade shell and that are internally connected to ground by a down-conductor. The receptors provide defined impact positions for the lightning strike. For shorter blades, this concept proved to be sufficient, but for longer blades, some portions of the blade surface continue to be unprotected.

Due to this problem, alternative lightning protection systems have been proposed. One system includes the lamination of a metallic lattice, conductive and flexible foils onto the outer blade shell. The processing step of including metallic lattice into the lamination procedure however, makes later ones more complicated and can also increase the costs due to the higher material expenses.

In view of the foregoing, it would be advantageous to provide a turbine blade lightning protection system that avoids these problems and expenses.

BRIEF DESCRIPTION

Briefly, in accordance with one embodiment, a wind turbine lightning protection system (LPS) comprises a glass-reinforced fiber or carbon-reinforced wind turbine blade comprising a tip portion adapted with an electric field control region disposed on or within the tip portion and encapsulating the tip portion to increase the emission of lightning streamers and leaders in the electric field control region and force a lightning discharge to attach to the tip portion, the electric field control region in electrical communication with a wind turbine blade down conductor disposed within the wind turbine blade, wherein the electric field control region and the down conductor together operate to protect the wind turbine blade from damage due to a lightning strike at the tip of the wind turbine blade by controlling an electric field at the tip portion caused by the lightning strike.

According to another embodiment, a wind turbine lightning protection system (LPS) comprises a fiber or carbon-reinforced wind turbine blade configured with a suction side and a pressure side, the wind turbine blade comprising a tip portion, the tip portion of the wind turbine blade configured with a conductive or semi-conductive material completely encapsulating the tip portion, defining an electric field control region, the wind turbine blade suction side and pressure side each configured with reinforced regions having similar characteristics as the electric field control region, wherein the electric field control region and the reinforced regions are together configured to conduct and guide a lightning discharge on a predefined path to control an electric field caused by a lightning strike at the tip portion.

According to yet another embodiment, a wind turbine lightning protection system (LPS) comprises:

a fiber or carbon-reinforced wind turbine blade;

a conductive or semi-conductive material disposed on or within a tip portion of the wind turbine blade and completely encapsulating the tip portion of the wind turbine blade defining an electric field control region; and a conductive or semi-conductive material disposed on or within remaining portions of the wind turbine blade to completely encapsulate the remaining portions of the wind turbine blade, defining a reinforced region having similar characteristics as the electric field control region, the electric field control region and the reinforced region together defining a Faraday cage region configured to provide electric field control of lightning discharges at the tip of the wind turbine blade.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Lightning current produced during a lightning strike in a conventional wind turbine rotor blade flows through the receptors (located on the blade) and then along the down conductor located inside the blade. The lightning current will flow to the bearing flange and pass through the rotor blade bearings and then through the hub. Isolations placed between the gear box and the generator prevents the lightning current from reaching the generator. Spark gap arrays and/or slip rings allow the lightning current to reach a spike inside the hollow main shaft that passes the lightning current to the tower. Grounding strips are located across each tower flange joint to ensure continuity to a foundation ground since the tower base is connected to earth ground via an earth grounding system.

Conventional lightning protection for wind turbine generator systems employ discrete lightning receptors distributed along the surface of or within the wind turbine blades. Due to the limited number of receptors, there is a high probability that lightning strikes will hit the blade between two receptors, leading to destruction of the blade composite material, which may lead to overall destruction of the blade and failure of the wind turbine lightning protection system.

Figure 1:
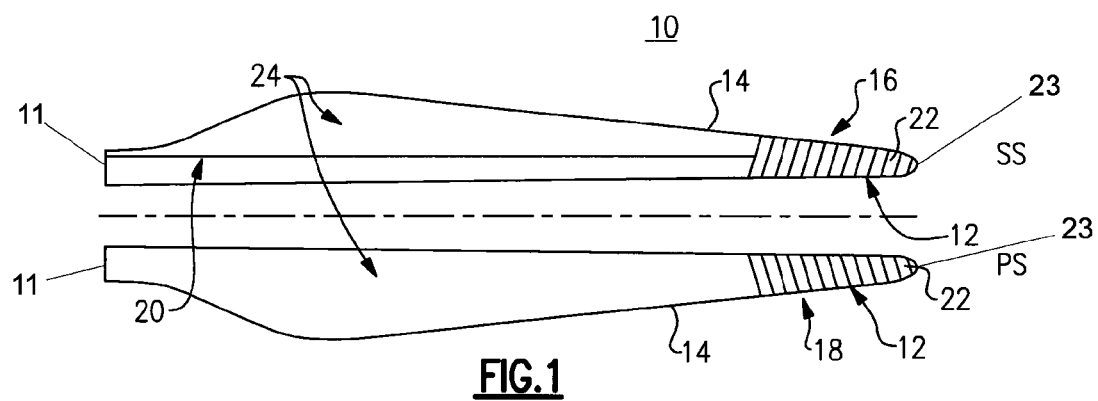
FIG. 1 illustrates a wind turbine blade tip lightning protection mechanism according to one embodiment of the invention.

Keeping the foregoing discussion in mind, embodiments of the invention that overcome the above described problems, among others, are now described below with reference to FIGS. 1-3; wherein FIG. 1 illustrates a wind turbine blade tip lightning protection mechanism 10 according to one embodiment of the invention.

Lightning protection mechanism 10 is applied to a tip portion 12 of a wind turbine blade 14. More specifically, lightning protection mechanism 10 is applied to the suction side 16 and the pressure side 18 of the wind turbine blade 14. According to one aspect of the invention, the wind turbine blade 14 is constructed from a predetermined glass-reinforced fiber or carbon-reinforced material. The wind turbine blade 14 further comprises a root 11 and a tip 23, and may also comprise a down conductor 20 disposed within the blade 14.

Lightning protection mechanism 10 is easily adapted to rotor blades that have already been installed, so called retrofitting. The tip portion 12 comprising both suction and pressure sides 16, 18 is reinforced by applying a conductive or semi-conductive material 22 i.e. sheet metal, metal mesh, flexible foil, ceramic, polymeric, etc, onto the surface or laminated within the rotor blade tip portion 12 which may be a composite material. FIG. 1 illustrates the conductive or semi-conductive material 22 applied at a predetermined distance from the root 11, and is applied between the predetermined distance and the tip 23 of the wind turbine blade 14. The conductive or semi-conductive material 22 is configured to form a type of Faraday cage around the insulating structure or composite material of the tip portion of the rotor blade 14. The conductive or semi-conductive material 22 is in electrical communication with the down-conductor 20 such that together, the down-conductor 20 and the conductive or semi-conductive material 22 function to control the electric field caused by a lightning strike at the tip portion 12 of the rotor blade 14.

Due to the conductive characteristics of the conductive or semi-conductive material 22, combined with its large dimensions compared to discrete receptors, breakdown discharges across the composite blade material (i.e. fiber or carbon-reinforced) are minimized. This is achieved by decreasing the surface impedance compared to the impedance of the composite material, such that a lightning leader will be guided to the nearest conductive attachment point before a high value current flashover occurs. The nearest conductive attachment point in this embodiment is provided via the existing down-conductor 20. The current density on the rotor blade 14 caused by a lightning strike will be reduced, leading to minimized thermal loading, due to the large dimensions of the conductive or semi-conductive material 22.

Because lightning protection mechanism 10 is particularly useful when adapting already installed rotor blades, the remaining portions 24 of a rotor blade 14 can optionally be covered by painting, for example, with conductive, semi-conductive or non-conductive paint(s) to achieve a desired result caused by a lightning strike. The foregoing lightning protection mechanism 10 provides several advantages over known lightning protection systems including without limitation:

i. Enhanced receptor size on blade surface due to full or partial coverage of rotor blade surface coating;
ii. External superficial conduction of the lightning current and thus minimization of the probability of internal lightning arc inside the blade 14 (flashover and possibly explosion caused by the sound pressure wave produced by the lightning strike;
iii. No significant increase in blade weight is observed;
iv. Flexible to all mechanical blade dynamics;
v. No change in blade-design required;
vi. Existing blade manufacturing (laminating) processes can be used with only slight modifications;
vii. Low additional material and manufacturing costs;
viii. Decrease of current density will lead to lower thermal loads on the blade materials;
ix. Enhanced lightning reception efficiency with diverter technology on the blade surface due to partial or full coverage of conductive or semi-conductive coating/materials;
x. Conduction of a lightning streamer over a safe path before the breakdown impulse current flashover occurs;
xi. Avoidance of breakdown and thus rotor blade damage by decreasing the surface impedance;
xii. Combined lightning protection that links conductive and conductively doped materials to one effective protection system;
xiii. Increased efficiency lightning protection for wind turbine blades;
xiv. No change in blade-design required;
xv. Extended rotor blade surface protection;
xvi. Increased reinforced conductive paths for a lightning current;
xvii. No internal lightning protection system and thus extra manufacturing processes to place the lightning protection system inside the rotor blade are required; and
xviii. Control of the electric field strength distribution during the lightning attachment process along the rotor blade.

Figure 2:
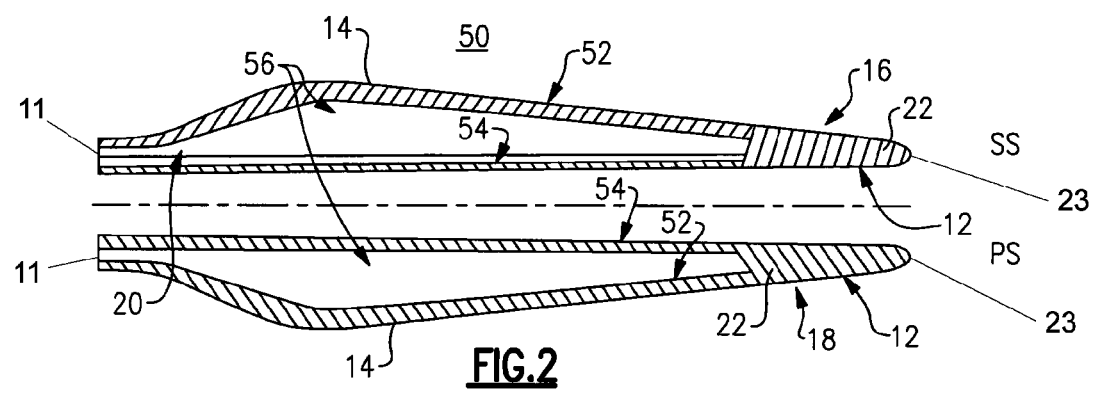
FIG. 2 illustrates a wind turbine blade tip lightning protection mechanism according to another embodiment of the invention.

FIG. 2 illustrates a wind turbine blade tip 23 lightning protection mechanism 50 according to another embodiment of the invention. Lightning protection mechanism 50 is easily adapted to rotor blades that have already been installed, but is also useful in construction of new rotor blades. Similar to the embodiment described above with reference to FIG. 1, the tip portion 12 comprising both suction and pressure sides 16, 18 is reinforced by applying a conductive or semi-conductive material 22 i.e. sheet metal, metal mesh, flexible foil, ceramic, polymeric, etc. onto the surface or laminated within the rotor blade tip portion 12 which may be a composite material. The conductive or semi-conductive material 22 is configured to form a type of Faraday cage around the insulating structure or composite material of the tip portion of the rotor blade 14. Further, FIG. 2 illustrates the conductive or semi-conductive material 22 is applied at a predetermined distance from the wind turbine blade 14 root 11, where it is applied between the predetermined distance and the tip 23 of the wind turbine blade 14.

The conductive or semi-conductive material 22 is in electrical communication with an existing down-conductor 20 when applied in a retrofit application for existing rotor blades, such that together, the down-conductor 20 and the conductive or semi-conductive material 22 function to control the electric field caused by a lightning strike at the tip portion 12 of the rotor blade 14.

When wind turbine blade tip lightning protection mechanism 50 is however applied to a new rotor blade, the down-conductor 20 can be eliminated to simplify manufacturing of the blade 14. In this embodiment, the use of down-conductor 20 is avoided simply by reinforcing upper and lower regions 52, 54 with conductive or semi-conductive material(s) having similar characteristics as the electric field control region (tip portion) 12 of the blade 14. The reinforced regions 52, 54, function to provide the requisite conductive attachment point before a high value current flashover occurs in response to a lightning strike.

Due to the conductive characteristics of the conductive or semi-conductive material 22, combined with its large dimensions compared to discrete receptors, breakdown discharges across the composite blade material (i.e. fiber or carbon-reinforced) are minimized, as stated above. This is achieved by decreasing the surface impedance compared to the impedance of the composite material, such that a lightning leader will be guided to the nearest conductive attachment point before a high value current flashover occurs. The nearest conductive attachment point in this embodiment is provided via the reinforced regions 52, 54. The current density on the rotor blade 14 caused by a lightning strike will be reduced, leading to minimized thermal loading, due to the large dimensions of the conductive or semi-conductive material 22.

Because lightning protection mechanism 50 is particularly useful when retrofitting already installed rotor blades or constructing new rotor blades, the remaining portions 56 of a rotor blade 14 can optionally be covered by painting, for example, with conductive, semi-conductive or non-conductive paint(s) to achieve a desired result caused by a lightning strike. The foregoing lightning protection mechanism 50 provides several advantages over known lightning protection systems such as described above with reference to lightning protection mechanism 10.

Figure 3:
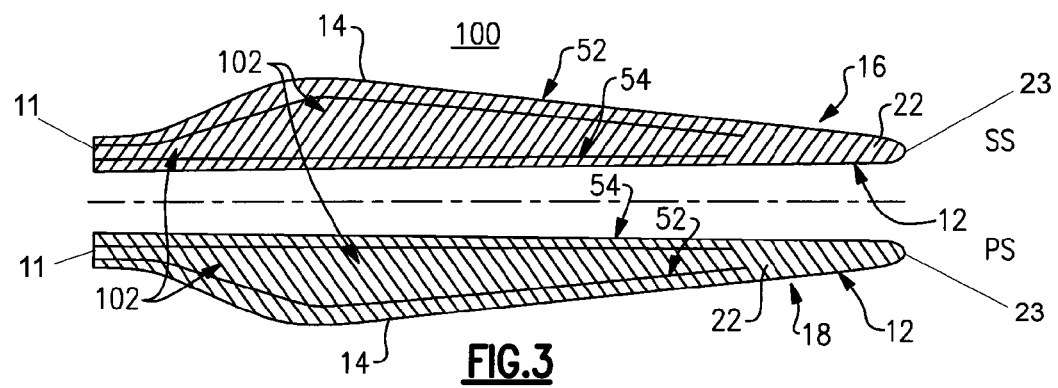
FIG. 3 illustrates a wind turbine blade tip lightning protection mechanism according to yet another embodiment of the invention.

FIG. 3 illustrates a wind turbine blade tip 23 lightning protection mechanism 100 according to yet another embodiment of the invention. Lightning protection mechanism 100 is suitable for construction of new rotor blades. Similar to the embodiments described above with reference to FIGS. 1 and 2, the electric field control region (tip portion) 12 comprising both suction and pressure sides 16, 18 is reinforced by applying a conductive or semi-conductive material 22 i.e. sheet metal, metal mesh, flexible foil, ceramic, polymeric, etc. onto the surface or laminated within the rotor blade tip portion 12 which may be a composite material. The conductive or semi-conductive material 22 is configured to form a type of Faraday cage around the insulating structure or composite material of the electric field control region (tip portion) of the rotor blade 14. Further, FIG. 3 illustrates the conductive or semi-conductive material 22 is applied at a predetermined distance from the wind turbine blade 14 root 11, where it is applied between the predetermined distance and the tip 23 of the wind turbine blade 14.

In this embodiment, the use of down-conductor 20 is avoided simply by reinforcing upper and lower regions 52, 54 with conductive or semi-conductive material(s) having similar characteristics as the electric field control region (tip portion) 12 of the blade 14. The conductive or semi-conductive material(s) can be applied via painting, coating or embedding the upper and lower regions 52, 54 with a conductive or semi-conductive coating or material. The conductive or semi-conductive material(s) can, for example, be laminated into desired portions of the rotor blade composite material, according to one embodiment. In this embodiment, any remaining portions 102 can be painted or coated with a material having conductive or semi-conductive properties to achieve a desired current density on the rotor blade 14. The reinforced regions 52, 54, function to provide the requisite conductive attachment point before a high value current flashover occurs in response to a lightning strike.

Due to the conductive characteristics of the conductive or semi-conductive material 22, combined with its large dimensions compared to discrete receptors, breakdown discharges across the composite blade material (i.e. fiber or carbon-reinforced) are minimized by decreasing the surface impedance compared to the breakdown impedance of the composite material, such that a lightning leader will be guided to the nearest conductive attachment point before a high value current flashover occurs, as stated above. The nearest conductive attachment point in this embodiment is provided via the reinforced regions 52, 54 alone or in combination with additional conductive or semi-conductive material installed on the surface or laminated into the blade composite material associated with the remaining portions 102 of the rotor blade. The current density on the rotor blade 14 thus caused by a lightning strike will be reduced, leading to minimized thermal loading, due to the large dimensions of the conductive or semi-conductive material(s) 22.

Similar to the embodiments described above with reference to FIGS. 1 and 2, portions 102 of the rotor blade 14 can optionally be covered by painting, for example, with conductive, semi-conductive or non-conductive paint(s) to achieve a desired result caused by a lightning strike. The foregoing lightning protection mechanism 100 provides several advantages over known lightning protection systems such as described above with reference to lightning protection mechanism 10.

In summary explanation, a wind turbine lightning protection system (LPS) comprising a fiber or carbon-reinforced wind turbine blade comprising a tip portion adapted with an electric field control region disposed on or within the tip portion and completely encapsulating the tip portion has been described according to particular embodiments. The electric field control region is in electrical communication with an electrical discharge conduction mechanism disposed on or within the wind turbine blade such that the electric field control region and the electric discharge conduction mechanism together operate to protect the wind turbine and its associated blades from damage due to a lightning strike at the tip of the wind turbine blade by controlling an electric field at the tip portion caused by the lightning strike. The present inventors found the electric field control region successful in conducting and guiding the discharge on a predefined path while simultaneously increasing the ability of the wind turbine blade to withstand several impulse currents with high peak values caused by the lightning strike.

The electric field region thus created, extends rotor blade surface protection, provides increased reinforced conductive paths for the lightning current, eliminates the need for a lightning protection system disposed within the rotor blade, and controls the electric field strength distribution on the rotor blade during the lightning attachment process.

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. A wind turbine lightning protection system (LPS) comprising a glass-reinforced fiber or carbon-reinforced wind turbine blade comprising a suction side, a pressure side, a root, a tip, and a tip portion separated a predetermined distance from the root, wherein the suction side and pressure side of the wind turbine blade are each configured with a conductive or semi-conductive material only between the predetermined distance from the root and the tip of the wind turbine blade to provide an electric field control region disposed on or within the tip portion and completely encapsulating the suction side and pressure side of the wind turbine blade only between the predetermined distance from the root and the tip of the wind turbine blade to increase the emission of lightning streamers and leaders in the electric field control region and force a lightning discharge to attach to the tip portion, the electric field control region in electrical communication with a wind turbine blade down conductor disposed within the wind turbine blade, wherein the electric field control region and the down conductor together operate to protect the wind turbine blade from damage due to a lightning strike at the tip of the wind turbine blade by controlling an electric field at the tip portion caused by the lightning strike.

2. The wind turbine LPS according to claim 1, wherein the electric field control region is configured to reinforce conductive paths for lightning current caused by the lightning strike.

3. The wind turbine LPS according to claim 1, wherein the electric field control region is configured to provide extended wind turbine blade surface protection against lightning current caused by the lightning strike.

4. The wind turbine LPS according to claim 1, wherein the electric field control region is configured to protect internal portions of the wind turbine blade without the need for a lightning protection system internal to the wind turbine blade.

5. The wind turbine LPS according to claim 1, wherein the electric field control region is configured to control the electric field strength distribution over the surface of the wind turbine blade during the lightning strike.

6. The wind turbine LPS according to claim 1, wherein the conductive or semi-conductive material is selected from sheet metal, metal mesh, flexible foil, ceramic, polymeric, and conductively doped coatings.

7. A wind turbine lightning protection system (LPS) comprising a glass-reinforced fiber or carbon-reinforced wind turbine blade, the wind turbine blade comprising a suction side, a pressure side, a root, a tip, and a tip portion separated a predetermined distance from the root, wherein the suction side and pressure side of the wind turbine blade are each configured with a conductive or semi-conductive material only between the predetermined distance from the root and tip of the wind turbine blade defining an electric field control region disposed on or within the tip portion and completely encapsulating the suction side and pressure side of the wind turbine blade only between the predetermined distance from the root and the tip of the wind turbine blade, the wind turbine blade suction side and pressure side each further configured with reinforced regions having similar characteristics as the electric field control region, wherein the electric field control region and the reinforced regions are together configured to conduct and guide a lightning discharge on a predefined path to control an electric field caused by a lightning strike at the tip.

8. The wind turbine LPS according to claim 7, wherein the reinforced regions comprise conductive or semi-conductive material covering or embedded into the surface of the suction side and the pressure side of the wind turbine blade.

9. The wind turbine LPS according to claim 7, wherein the electric field control region is configured to reinforce conductive paths for lightning current caused by the lightning strike.

10. The wind turbine LPS according to claim 7, wherein the electric field control region is configured to provide extended wind turbine blade surface protection against lightning current caused by the lightning strike.

11. The wind turbine LPS according to claim 7, wherein the electric field control region is configured to protect internal portions of the wind turbine blade without the need for a lightning protection system internal to the wind turbine blade.

12. The wind turbine LPS according to claim 7, wherein the electric field control region is configured to control the electric field strength distribution over the surface of the wind turbine blade during the lightning strike.

13. The wind turbine LPS according to claim 7, wherein the conductive or semi-conductive material comprises an antimony doped compound.

14. The wind turbine LPS according to claim 7, wherein the conductive or semi-conductive material is selected from sheet metal, metal mesh, flexible foil, ceramic, polymeric, and conductively doped coatings.

15. A wind turbine lightning protection system (LPS) comprising:
    a fiber or carbon-reinforced wind turbine blade comprising a suction side, a pressure side, a root, a tip, and a tip portion separated a predetermined distance from the root;
    a conductive or semi-conductive material disposed on or within the surface of a tip portion of the wind turbine blade and completely encapsulating the suction side and pressure side of the wind turbine blade only between the predetermined distance from the root and the tip of the wind turbine blade, defining an electric field control region; and
    a conductive or semi-conductive material disposed on or within remaining portions of the wind turbine blade to completely encapsulate the remaining portions of the wind turbine blade, defining a reinforced region having similar characteristics as the electric field control region, the electric field control region and the reinforced region together defining a Faraday cage region configured to provide electric field control of lightning discharges at the tip of the wind turbine blade.

16. The wind turbine LPS according to claim 15, further comprising a coating of conductive, semi-conductive or non-conductive material covering the reinforced region and remaining portions of the wind turbine blade.

17. The wind turbine LPS according to claim 15, wherein the electric field control region is configured to reinforce conductive paths for lightning current caused by the lightning strike.

18. The wind turbine LPS according to claim 15, wherein the electric field control region is configured to provide extended wind turbine blade surface protection against lightning current caused by the lightning strike.

19. The wind turbine LPS according to claim 15, wherein the electric field control region is configured to protect internal portions of the wind turbine blade without the need for a lightning protection system internal to the wind turbine blade.

20. The wind turbine LPS according to claim 15, wherein the electric field control region is configured to control the electric field strength distribution over the surface of the wind turbine blade during the lightning strike.

21. The wind turbine LPS according to claim 15, wherein the conductive or semi-conductive material comprises an antimony doped compound.

22. The wind turbine LPS according to claim 15, wherein the conductive or semi-conductive material is selected from sheet metal, metal mesh, flexible foil, ceramic, polymeric, and conductively doped coatings.

* * * * *

UNITED STATES PATENT AND TRADEMARK OFFICE
CERTIFICATE OF CORRECTION

| | |
|---|---|
| PATENT NO. | : 8,137,074 B2 |
| APPLICATION NO. | : 12/229334 |
| DATED | : March 20, 2012 |
| INVENTOR(S) | : Mendez Hernandez et al. |

It is certified that error appears in the above-identified patent and that said Letters Patent is hereby corrected as shown below:

On the Face Page, in Field (75), under "Inventors", in Column 1, Line 2, delete "Bastina" and insert -- Bastian --, therefor.

Signed and Sealed this
Twenty-second Day of May, 2012

David J. Kappos
*Director of the United States Patent and Trademark Office*